United States Patent [19]

Evans

[11] Patent Number: 5,413,737

[45] Date of Patent: May 9, 1995

[54] MIXTURES AND COMPOSITIONS CONTAINING PHENOTHIAZINES

[75] Inventor: Samuel Evans, Marly, Switzerland

[73] Assignee: Ciba-Geigy Corporation, Ardsley, N.Y.

[21] Appl. No.: 231,967

[22] Filed: Apr. 22, 1994

Related U.S. Application Data

[63] Continuation of Ser. No. 46,115, Apr. 9, 1993, abandoned, which is a continuation of Ser. No. 956,820, Oct. 5, 1992, abandoned, which is a continuation of Ser. No. 758,937, Sep. 11, 1991, abandoned.

[30] Foreign Application Priority Data

Sep. 13, 1990 [CH] Switzerland .................. 2972/90

[51] Int. Cl.$^6$ ............................................... C09K 15/26
[52] U.S. Cl. .................................... 252/405; 252/406; 544/31; 544/35; 544/36
[58] Field of Search .................. 252/405, 406; 544/31, 544/35, 36

[56] References Cited

U.S. PATENT DOCUMENTS

| | | | |
|---|---|---|---|
| 2,433,658 | 12/1947 | Geiger et al. | 544/36 |
| 2,587,662 | 3/1952 | Smith | 544/35 |
| 3,468,798 | 9/1969 | Panzer | 544/31 X |
| 4,798,684 | 1/1989 | Salomon | 252/402 |
| 4,824,601 | 4/1989 | Franklin | 252/402 |
| 4,915,858 | 4/1990 | Salomon | 252/402 |
| 5,024,774 | 6/1991 | Salomon | 544/41 X |
| 5,035,817 | 7/1991 | Salomon | 252/402 |
| 5,073,278 | 12/1991 | Schumacher et al. | 252/47.5 |

FOREIGN PATENT DOCUMENTS

| | | |
|---|---|---|
| 1090688 | 11/1967 | United Kingdom . |
| 1140089 | 1/1969 | United Kingdom . |
| 1347141 | 2/1974 | United Kingdom . |

Primary Examiner—Gary Geist
Assistant Examiner—Valerie Fee
Attorney, Agent, or Firm—Michele A. Kovaleski; Luther A. R. Hall

[57] ABSTRACT

A mixture containing phenothiazines which is obtainable by reacting a mixture of diphenylamines comprising

| | |
|---|---|
| 1 to 5% by weight of | a) diphenylamine |
| 8 to 18% by weight of | b) 4-tert-butyldiphenylamine |
| 21 to 31% by weight of | c) one or more compounds selected from |
| | i) 4-tert-octyldiphenylamine |
| | ii) 4,4'-di-tert-butyldiphenylamine |
| | iii) 2,4,4'-tris-tert-butyldiphenylamine |
| 20 to 31% by weight of | d) one or more compounds selected from |
| | i) 4-tert-butyl-4'-tert-octyldiphenylamine |
| | ii) 2,2'- or 2,4'-di-tert-octyldiphenylamine |
| | iii) 2,4-di-tert-butyl-4'-tert-octyldiphenylamine, |
| and | |
| 15 to 29% by weight of | e) the compound |
| | i) 4,4'-di-tert-octyldiphenylamine, or the compounds |
| | i) 4,4'-di-tert-octyldiphenylamine and |
| | ii) 2,4-di-tert-octyl-4'-tert-butyldiphenylamine, | with 1 to 200 mol % of elemental sulfur, in the presence of 0.25 to 5 mol % of a condensation catalyst selected from the group consisting of iodine, aluminium bromide, aluminium chloride, iron(Ill) chloride, antimony chloride, copper iodide or sulfur iodide, in the temperature range from 80° to 250° C.

The mixture containing phenothiazines finds utility as antioxidant in organic materials which are subject to degradation induced by oxidation, heat or exposure to actinic light, especially in lubricants and hydraulic fluids.

16 Claims, No Drawings

MIXTURES AND COMPOSITIONS CONTAINING PHENOTHIAZINES

This is a continuation of application Ser. No. 08/046,115, filed on Apr. 9, 1993, now abandoned which is a continuation of application Ser. No. 07/956,820, filed on Oct. 5, 1992, also abandoned, which is a continuation of application Ser. No. 07/758,937, filed on Sept. 11, 1991, also abandoned.

The present invention relates to mixtures containing phenothiazines and to compositions comprising said mixtures. The invention further relates to the preparation of the novel mixtures and to the use thereof as antioxidants in organic materials which are subject to degradation induced by oxidation, heat or exposure to actinic light.

It is known in the art to prepare phenothiazine by reacting diphenylamine with sulfur, (q.v. US-A-2 433 658). It is also taught in US-A-2 587 662 to prepare the corresponding 3-isopropoxyphenothiazine by reacting 4-isopropoxydiphenylamine with sulfur. This product is disclosed as antioxidant for e.g. mineral and synthetic lubricant oils.

It is taught in GB patent specification 1 090 688 that dialkylated diphenylamines and synergistic combinations thereof are suitable for use as antioxidants in synthetic lubricants. Also disclosed are monoalkylated phenothiazines which are effective antioxidants in synthetic lubricants even at elevated temperatures.

A number of 1-tert-butyl-3,7-dialkylphenothiazines are disclosed in GB patent specification 1140 089 as antioxidants for synthetic lubricants and polymeric resins.

In GB patent specification 1 347 141 there are disclosed further phenothiazines which are substituted in 3-, 7- and, in some cases, 1-position by an aralkyl group. These phenothiazines may be used in lubricants in admixture with alkylated amines, such as dioctyldiphenylamine or dioctylphenothiazines.

Surprisingly, it has now been found that a novel mixture containing phenothiazines and novel compositions comprising said mixture have superior properties to known products. A process for the preparation of these mixtures is also provided.

Specifically, the invention relates to a mixture containing phenothiazines which is obtainable by reacting a mixture of diphenylamines comprising

| | |
|---|---|
| 1 to 5% by weight of | a) diphenylamine |
| 8 to 18% by weight of | b) 4-tert-butyldiphenylamine |
| 21 to 31% by weight of | c) one or more compounds selected from |
| | i) 4-tert-octyldiphenylamine |
| | ii) 4,4'-di-tert-butyldiphenylamine |
| | iii) 2,4,4'-tris-tert-butyldiphenylamine |
| 20 to 31% by weight of | d) one or more compounds selected from |
| | i) 4-tert-butyl-4'-tert-octyldiphenylamine |
| | ii) 2,2'- or 2,4'-di-tert-octyldiphenylamine |
| | iii) 2,4-di-tert-butyl-4'-tert-octyldiphenylamine, |
| and | |
| 15 to 29% by weight of | e) the compound |
| | i) 4,4'-di-tert-octyldiphenylamine, or the compounds |
| | i) 4,4'-di-tert-octyldiphenylamine and |
| | ii) 2,4-di-tert-octyl-4'-tert-butyldiphenylamine, | with 1 to 200 mol % of elemental sulfur, in the presence of 0.25 to 5 mol % of a condensation catalyst selected from the group consisting of iodine, aluminium bromide, aluminium chloride, iron(III) chloride, antimony chloride, copper iodide or sulfur iodide, in the temperature range from 80° to 250° C.

Throughout this specification, mol % refers to the molar amount of the respective diphenylamine mixture used.

The composition of the diphenylamine mixture is governed by its preparation (reaction of diphenylamine with diisobutylene), which is described hereinafter. The compounds designated i) in the fractions c), d) and e) are the main components.

Depending on the amount of sulfur, mixtures can be prepared which have a low content (small amount of sulfur) or a high content of phenothiazines (large amount of sulfur).

The invention further relates to a mixture containing phenothiazines obtainable by reacting diphenylamine with diisobutylene, the process comprising carrying out the reaction in the presence of an activated alumina catalyst, keeping the concentration of diisobutylene substantially constant for the duration of the reaction, the reaction temperature being at least 160° C., carrying out the reaction until the concentration of 4,4 '-di-tert-octyldiphenylamine, based on the reaction mass without catalyst, is below 30% by weight, preferably below 25% by weight, and the concentration of diphenylamine is below 10% by weight, preferably below 5% by weight, removing the catalyst and unreacted diisobutylene, isolating the resultant liquid product and subsequently reacting said product with 1 to 200 mol % of elemental sulfur in the presence of 0.25 to 5 mol % of a condensation catalyst selected from the group consisting of iodine, aluminium bromide, aluminium chloride, iron(Ill) chloride, antimony chloride, copper iodide or sulfur iodide, in the temperature range from 80° to 250° C.

A useful mixture containing phenothiazines is prepared by reaction with 5 to 200 mol %, preferably 5 to 150 mol %, of elemental sulfur.

A further useful embodiment of the mixture containing phenothiazines as described above is obtainable by reaction with 150 to 200 mol %, preferably 180 to 200 mol %, of elemental sulfur.

This last mentioned mixture contains substantially or exclusively only phenothiazines, whereas the diphenylamines are substantially or completely reacted.

A preferred mixture containing phenothiazines is obtainable by reaction with 5 to 100 tool %, typically 50 to 100 mol %, of elemental sulfur.

Another preferred mixture containing phenothiazines is obtainable by reaction with 20 mol % of elemental sulfur.

In a preferred mixture containing phenothiazines the sum of the phenothiazines is 10 to 20% by weight, and the sum of the diphenylamines 8 to 90% by weight, based on 100% by weight of the entire mixture.

The novel mixture containing phenothiazines can be prepared by reacting a mixture of diphenylamines comprising

| | |
|---|---|
| 1 to 5% by weight of | a) diphenylamine |
| 8 to 18% by weight of | b) 4-tert-butyldiphenylamine |
| 21 to 31% by weight of | c) one or more compounds selected |

| | |
|---|---|
| 20 to 31% by weight of | from<br>i) 4-tert-octyldiphenylamine<br>ii) 4,4'-di-tert-butyldiphenylamine<br>iii) 2,4,4'-tris-tert-butyldiphenylamine<br>d) one or more compounds selected from<br>i) 4-tert-butyl-4'-tert-octyldiphenylamine<br>ii) 2,2'- or 2,4'-di-tert-octyldiphenylamine<br>iii) 2,4-di-tert-butyl-4'-tert-octyldiphenylamine, |
| and | |
| 15 to 29% by weight of | e) the compound<br>i) 4,4'-di-tert-octyldiphenylamine, or<br>the compounds<br>i) 4,4'-di-tert-octyldiphenylamine and<br>ii) 2,4-di-tert-octyl-4'-tert-butyldiphenylamine, | with 1 to 200 mol % of elemental sulfur, in the presence of 0.25 to 5 mol % of a condensation catalyst selected from the group consisting of iodine, aluminium bromide, aluminium chloride, iron (III) chloride, antimony chloride, copper iodide or sulfur iodide, in the temperature range from 80° to 250° C.

In a preferred embodiment of the process, the reaction is carded out with 5 to 200 mol %, preferably 5 to 150 mol %, of elemental sulfur.

In a further preferred embodiment of the process, the reaction is carried out with 150 to 200 mol %, preferably 180 to 200 mol %, of elemental sulfur.

A preferred process comprises carrying out the reaction with 5 to 100 mol %, preferably 50 to 100 tool %, of elemental sulfur.

A further preferred process comprises carrying out the reaction with 20 mol % of elemental sulfur.

Preferred embodiments of the process also comprise carrying out the reaction in the presence of 0.5–2 mol %, preferably 0.5–1 mol %, of catalyst.

Iodine is conveniently used as catalyst for the reaction. It is preferred to carry out the reaction in the presence of 0.5–1 mol % and, more particularly,, 0.67 mol %, of iodine. Under the indicated conditions, the process for the preparation of the mixture containing phenothiazines can be carried out in the presence or absence of a solvent. The amount of solvent is not critical. Illustrative examples of suitable solvents are aromatic hydrocarbons such as toluene or xylene and/or high-boiling paraffins, and also chloro- or nitrobenzenes, alcohols, typically those of the series of ethanol to the octanols, and dimethyl formamide.

The reaction temperature is in the range from 80° to 250° C., the preferred range being from 120° to 170° C. Hydrogen sulfide ($H_2S$) forms during the reaction. This gaseous product is known to be toxic and is therefore conveniently removed from the reaction mixture and passed through an aqueous solution of an alkali metal hydroxide to form the corresponding alkali metal sulfide, which can be removed for disposal.

The reaction time may be from 1 to 15 hours, conveniently from 2 to 4 hours. A reaction time of about 3 hours is preferred.

The reaction can be carded out by charging the diphenylamine mixture, if desired dissolved in the indicated solvent, the sulfur and the catalyst to the reactor. With stirring, the mixture is heated to the indicated temperature. The reaction course can be followed by means of the hydrogen sulfide formation. The hydrogen sulfide should be removed continuously from the reaction system and destroyed. After the stated time, or if no more free sulfur can be detected by a suitable method of analysis, the reaction can be terminated. It is then convenient to cool and degas the batch under vacuum and to remove the solvent, if used. Further working up is normally not necessary.

In accordance with the amount of sulfur originally used and the amount of diphenylamines, the reaction affords a mixture containing the corresponding phenothiazines and, if the amount of sulfur has been kept appropriately low, also unreacted diphenylamines.

Mixtures containing the phenothiazines and the diphenylamines as previously described are especially useful, and the preferred amounts are also stated above.

The mixture of starting diphenylamines comprises

| | |
|---|---|
| 1 to 5% by weight of | a) diphenylamine |
| 8 to 18% by weight of | b) 4-tert-butyldiphenylamine |
| 21 to 31% by weight of | c) one or more compounds selected from<br>i) 4-tert-octyldiphenylamine<br>ii) 4,4'-di-tert-butyldiphenylamine<br>iii) 2,4,4'-tris-tert-butyldiphenylamine |
| 20 to 31% by weight of | d) one or more compounds selected from<br>i) 4-tert-butyl-4'-tert-octyldiphenylamine<br>ii) 2,2'- or 2,4'-di-tert-octyldiphenylamine<br>iii) 2,4-di-tert-butyl-4'-tert-octyldiphenylamine, |
| and | |
| 15 to 29% by weight of | e) the compound<br>i) 4,4'-di-tert-octyldiphenylamine, or<br>the compounds<br>i) 4,4'-di-tert-octyldiphenylamine and<br>ii) 2,4-di-tert-octyl-4'-tert-butyldiphenylamine. |

The mixture of diphenylamines as described above may be obtained by reacting diphenylamine with diisobutylene, the process comprising carrying out the reaction in the presence of an activated alumina catalyst, keeping the concentration of diisobutylene substantially constant for the duration of the reaction, the reaction temperature being at least 160° C., carrying out the reaction until the concentration of 4,4'-di-tert-octylphenylamine, based on the reaction mass without catalyst, is below 30% by weight, preferably below 25% by weight, and the concentration of diphenylamine is below 10% by weight, preferably below 5% by weight, removing the catalyst and unreacted diisobutylene, and isolating the resultant liquid product.

The process is described in detail in EP-A-0 149 422.

The present invention also relates to a composition comprising organic materials which are subject to degradation induced by oxidation, heat and exposure to actinic light, and a novel mixture containing phenothiazines.

The organic materials contain typically 0.01 to 10% by weight, conveniently 0.05 to 5% by weight, preferably 0.05 to 3% by weight, and, most preferably, 0.1 to 2% by weight, of the novel mixture.

The organic materials which are subject to degradation induced by oxidation, heat and exposure to actinic light may typically comprise the following groups:

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbomene, polyethylene (which can be uncrosslinked or crosslinked), for example high density polyethylene (HDPE), low density polyethylene (LDPE and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers linear low density polyethylene (LLDPE) and mixtures thereof with low density polyethylene (LDPE), propylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and their salts (ionomers), as well as terpolymers of ethylene with propylene and a diene such as hexadiene, dicyclopentadiene or ethylidenenorbornene; and also mixtures of such copolymers with each other and with polymers mentioned in 1) above, for example polypropylene/ethylene propylene copolymers, LDPE/EVA, LDPE/EAA, LLDPE/EVA and LLDPE/EAA.

3a. Hydrocarbon resins (for example C5–C9), including, hydrogenated modifications thereof (for example tackifiers).

4. Polystyrene, poly-(p-methylstyrene), poly-(α-methylstyrene).

5. Copolymers of styrene or a-methylstyrene with dienes or acrylic derivatives, for example styrene[ch]butadiene, styrene/acrylonitrile, styrene/alkylmethacrylate, styrene/butadiene/alkylacrylate, styrene/maleic anhydride, styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/styrene or styrene/ethylene/propylene/styrene.

6. Graft copolymers of styrene or a-methylstyrene, for example styrene on polybutadiene, styrene on polybutadiene/styrene or polybutadiene/acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyalkylacrylates or polyalkylmethacrylates, styrene and acrylonitrile on acrylate/butadiene copolymers, as well as mixtures thereof with the copolymers listed under 5), for example the copolymer mixtures known as ABS, MBS, ASA or AES polymers.

7. Halogenated polymers such as polychloroprene, chlorinated rubbers, chlorinated or sulfochlorinated polyethylene, copolymers of ethylene and chlorinated ethylene, epichlorohydrin homo- and copolymers, preferably polymers of halogenated vinyl compounds, for example poly- vinylchloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from α,β-unsaturated acids and derivatives thereof, such as polyacrylates and polymethacrylates, polyacrylamides and polyacrylonitriles.

9. Copolymers of the monomers mentioned under 8) with each other or with other unsaturated monomers, for example acrylonitrile/butadiene copolymers, acrylonitrile/alkylacrylate copolymers, acrylonitrile/alkoxyalkylacrylate or acrylonitrile/vinyl halide copolymers or acrylonitrile/alkylmethacrylate/butadiene terpolymers.

10. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinylbutyrate, polyallyl phthalate or polyallylmelamine; as well as their copolymers with the olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides and mixtures thereof with polystyrene or polyamides.

14. Polyurethanes which are derived from polyethers, polyesters or polybutadienes carrying terminal hydroxyl groups on the one hand and aliphatic or aromatic polyisocyanates on the other, as well as precursors thereof.

15. Polyamides and copolyamides which are derived from diamines and dicarboxylic acids and or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylenediamine and isophthalic and/or terephthalic acid, with or without an elastomer as modifier, for example poly-2,4,4,-trimethylhexamethylene terephthalamide or poly-m-phenylene isophthalamide; block copolymers of the aforementioned polyamides with polyolefins, olefin copolymers, ionomers or chemically bonded or grafted elastomers; or with polyethers, for example with polyethylene glycol, polypropylene glycol or polytetramethylene glycol; and also polyamides or copolyamides modified with EPDM or ABS, and polyamides condensed during processing (RIM polyamide systems).

16. Polyureas, polyimides and polyamide-imides and polybenzimidazoles.

17. Polyesters derived from dicarboxylic acids and diols and/or from hydroxycarboxylic acids or the corresponding lactones, such as poly-ethylene terephthalate, polybutylene terephthalate, poly-1,4-dimethylolcyclohexane terephthalate, polyhydroxybenzoates as well as block-copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyl resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Crosslinkable acrylic resins derived from substituted acrylic esters such as epoxy acrylates, urethane acrylates or polyester acrylates.

24. Alkyl resins, polyester resins or acrylate resins which are cross-linked with melamine resins, urea resins, polyisocyanates or epoxy resins.

25. Crosslinked epoxy resins which are derived from polyepoxides, for example from bisglycidyl ethers or from cycloaliphatic diepoxides.

26. Natural polymers such as cellulose, rubber, gelatine and chemically modified homologous derivatives thereof such as cellulose acetates, cellulose propionates and cellulose butyrates, or the cellulose ethers, such as methylcellulose; as well as rosins and their derivatives.

27. Mixtures (polyblends) of the aforementioned polymers, for example PP/EPDM, Polyamide 6/EPDM or ABS, PVC/EVA, PVS/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/ItlPS, PPE/PA 6.6 and copolymers, PA/HDPE, PA/PP, PA/PPE.

28. Naturally occurring and synthetic organic materials which are pure monomeric compounds or mixtures of such compounds, for example mineral oils, animal and vegetable fasts, oil and waxes, or oils, fats and waxes based on synthetic esters (e.g. phthalates, adipates, phosphates or trimellitates) and also the mixtures of synthetic esters with mineral oils in any weight ratios which are used as spinning compositions, as well as aqueous emulsions of such materials.

29. Aqueous emulsions of natural or synthetic rubber, for example natural latex or latices of carboxylated styrene/butadiene copolymers.

Among these organic materials, the polymeric organic materials are of interest and of these the synthetic polymers are preferred. The polyolefins and elastomers are particularly preferred.

The polymeric organic materials may also contain other additives which are incorporated for further enhancement of the properties of such materials.

Illustrative examples of such further additives are:

1. Antioxidants 1.1. Alkylated monophenes, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 4,4'-thiobis(6-tert-butyl-2-methylphenol).

1.4. Alkylidenebisphenols 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6,cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis, [6-($\alpha$-methylbenzyl)-4-nonylphenol], 2,2'-methylenebis[6-($\alpha,\alpha$-dimethylbenzyl-4nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris-(3,5-dicyclohexyl-4-hydroxybenzyl)isocyanurate.

1.6. Acylaminophenols, for example 4-hydroxylauranilide, 4-hydroxystearanilide, 2,4-bis(octylmercapto)-6-(3,5-di-tert-butyl-4-hydroxyanilino)-s- triazine, octyl N-(3,5-di-tert-butyl-4-hydroxyphenyl)carbamate.

1.7. Esters of [β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.8. Esters of [α-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.10. Imides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis ( 3,5-di-tert-butyl-4-hydroxyphenyl propionyl ) triethylene-diamine, N,N'-bis(3,5-di-tert-butyl-4-hydroxyphenylpropionyl)hydrate.

2. UV absorbers and light stabilizers 2.1.2-(2'-Hydroxyphenyl)benzotriazioes, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-see- butyl-5'-tert-butyl, 4'-octoxy, 3',5'-di-tert-amyl and 3',5'-bis(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxy- benzoate and hexadecyl 3,5-di-tert-butyl-4-hydroxybenzoate.

2.4. Acrylates, for example ethyl α-cyano-[β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbo-methoxy-p-methoxycinnamate and N-(β-carbomethoxy-β-cyanovinyl)-2-methylindoline.

2.5. Nickel compounds, for example nickel complexes of 2,2'-thio-bis[4-( 1,1,3,3-tetramethylbutyl)-phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Sterically hindered amines, for example bis(2,2,6,6-tetramethyl-piperidyl) sebacate, bis(1,2,2,6,6-pentamethylpiperidyl) sebacate, bis( 1,2,2,6,6-pentamethylpipefidyl) n-butyl-3,5-di-tert-butyl-4-hydroxy-benzylmalonate, the condensation product of 1-(2-hydroxyethyl)-2,2,6,6-tetramethyl-4-hydroxypipefidine and succinic acid, the condensation product of N,N'-bis(2,2,6,6-tetramethyl-4-piperidyl)hexamethylenediamine and 4-tert-octylamino-2,6-dichloro- 1,3,5-triazine, tris(2,2,6,6-tetramethyl-4-piperidyl) nitrilotriacetate, tetrakis(2,2,6,6-tetramethyl-4- pipefidyl)-1,2,3,4-butane-tetracarboxylate, 1,1'-( 1,2-ethanediyl)bis-(3,3,5,5-tetramethylpiperazinone ).

2.7. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o- and p-ethoxydisubstituted oxanilides.

3. Metal deactivators, for example N,N'-diphenyloxalyl diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloyl- amino- 1,2,4-triazole, bis(benzylidene )oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl) pentaerythritol diphosphite, tristearyl sorbitol triphosphite, tetrakis-(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

5. Compounds which decompose peroxide, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilizers, for example, copper salts in conjunction with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium stearate, sodium ricinoleate and potassium palmirate, antimony pyrocatecholate or zinc pyrocatecholate.

8. Nucleating agents, for example, 4-tert-butylbenzoic acid, adipic acid, diphenylacetic acid.

9. Fillers and reinforcing agents, for example calcium carbonate, silicates, glass fibers, asbestos, talc, kaolin, mica, barium sulfate, metal oxides and hydroxides, carbon black, graphite.

10. Other additives, for example, plasticisers, lubricants, emulsifiers, pigments, fluorescent whitening agents, flameproofing agents, antistatic agents and blowing agents.

A preferred group of the cited organic materials comprises that of the functional fluids. These include in particular the lubricants and hydraulic fluids.

The suitable lubricants and hydraulic fluids are known to the skilled person and are described, inter alia, in Dieter Klamann "Schmierstoffe und verwandte Produkte" (Lubricants and Related Products), Verlag Chemie, Weinheim, 1982, in Schewe-Kobek, "Das Schmiermittel-Taschenbuch" (The Lubricant Handbook), Dr. Alfred Hüithig-Verlag, Heidelberg, 1974, or in Ullmanns Encyclopidie der technischen Chemie (Ullmann's Encyclopedia of Industrial Chemistry), Vol. 13, pp. 85–94 (Verlag Chemie, Weinheim, 1977).

The lubricant may be an oil or a fat, for example one based on a mineral oil. The mineral oils are based preferably on hydrocarbon compounds.

Synthetic lubricants typically comprise lubricants based on aliphatic or aromatic carboxylates, polymeric esters, polyalkylene oxides, phosphates, poly-α-olefins or silicones, on a diester of a rivalent acid with a monohydric alcohol, for example dioctyl sebacate or dinonyl adipate, on a triester of trimethylolpropane with a monovalent acid or with a mixture of such acids, for example trimethylolpropane tripelargonate, trimethylolpropane tricaprylate or mixtures thereof, on a tetraester of pentaerythritol with a divalent acid or with a mixture of such acids, for example pentaerythritol tetracaprylate, or on a complex ester of monovalent and divalent acids with polyhydric alcohols, for example a complex ester of trimethylolpropane with caprylic and sebacic acid or of a mixture thereof. Especially suitable are, in addition to mineral oils, for example poly-α-olefins, ester-based lubricants, phosphates, glycols, polyglycols and polyalkylene glycols, and mixtures thereof with water.

Particularly preferred lubricants are the hydrotreated base stock oils, the so-called hydrorefined oils).

The lubricants and hydraulic fluids may also contain other additives which are added for further enhancement of the basic properties of said fluids. Such additional additives comprise antioxidants, metal deactivators, rust inhibitors, viscosity index improvers, pour-point depressants, dispersants, detergents and other antiwear additives.

Illustrative examples of additional antioxidants will be found in the list above "1. Antioxidants", itemsl.1. to 1.10.

Further additives for the lubricants and hydraulic fluids may be mentioned. Exemplary of such further additives are:

Examples of Amine Antioxidants

N,N'-diisopropyl-p-phenylenediamine, N,N'-di-sec-butyl-p-phenylenediamine, N,N'-bis-1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(naphthyl-2)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)-amino]ethane, 1,2-bis(phenylamino)propane, (o-tolyl)biguanide, bis[4-( 1',3'-dimethylbutyl)phenyl]amine, tert-octylated N-phenyl-1-naphthylamine, mixture of mono- and dialkylated tert-butyl/tert-octyldiphenylamines, 2,3-dihydro-3,3-dimethyl-4H-1,4-benzothiazine, phenothiazine, N-allylphenothiazine.

Examples of Further Antioxidants

Aliphatic or aromatic phosphites, esters of thiodipropionic acid or of thiodiacetic acid, or salts of dithiocarbamic or dithiophosphoric acid.

Examples of metal deactivators, for example for copper, are: triazoles, benzotriazoles and derivatives thereof, tolutriazoles and derivatives thereof, 2-mercaptobenzothiazole, 2-mercaptobenzotriazole, 2,5-dimercaptobenzotfiazole, 2,5-dimercaptobenzothiadiazole, 5,5'-methylenebisbenzotriazole, 4,5,6,7-tetrahychobenzouiazole, salicylidene propylenediamine, salicylaminoguanidine and the salts thereof.

Examples of rust inhibitors are:
a) organic acids and the esters, metal salts and anhydrides thereof, for example: N-oleoyl sarcosine, sorbitan monooleate, lead naphthenate, alkenylsuccinic anhydride, for example dodecenylsuccinic anhydride, alkenylsuccinic partial esters and partial amides, 4-nonylphenoxyacetic acid.
b) Nitrogen-containing compounds, for example:
I. Primary, secondary or tertiary aliphatic or cycloaliphatic amines and amine salts of organic and inorganic acids, for example oil-soluble alkylammonium carboxylates.
II. Heterocyclic compounds, for example: substituted imidazolines and oxazolines.
c) Phosphorus-containing compounds, for example: amine salts of phosphoric acid partial esters or phosphonic acid partial esters, zinc dialkyldithiophosphates.
d) Sulfur-containing compounds, for example: barium dinonylnaphthalene sulfonates, calcium petroleum sulfonates.

Examples of viscosity index improvers are: polyacrylates, polymethacrylates, vinyl pyrrolidone/methacrylate copolymers, polyvinylpyrrolidones, polybutenes, olefin copolymers, styrene/acrylate copolymers, polyethers.

Examples of pour-point depressants are: polymethacrylates, alkylated naphthalene derivatives.

Examples of dispersants/surfactants are: polybutenylsuccinamides or -imides, polybutenylphosphonic acid derivatives, basic magnesium, calcium, and barium sulfonates and phenolates.

Examples of antiwear additives are: sulfur and/or phosphorus and/or halogen-containing compounds such as sulfonated vegetable oils, zinc dialkyl dithiophosphates, tritolylphosphate, chlorinated paraffins, alkyl and aryldi- and trisulfides, triphenylphosphorothionates, diethanolaminomethyltolyltriazole, bis(2-ethylhexyl)aminomethyltolyltriazole.

The present invention also relates to compositions comprising
a) an organic material which is subject to degradation induced by oxidation, heat and exposure to actinic light, and b) a novel mixture containing phenothiazines as claimed herein.

Useful compositions are those comprising
a) a functional fluid selected from the series of the lubricants and hydraulic fluids or a polymefic organic material, and
b) a novel mixture containing phenothiazines as claimed herein.

The composition preferably comprises
a) a lubricant selected from the series of the mineral oils, synthetic oils or a mixture thereof, and
b) a novel mixture containing phenothiazines as claimed herein.

The composition most preferably comprises
a) a hydro-treated base stock oil, and
b) a novel mixture containing phenothiazines as claimed herein.

The invention also relates to compositions comprising
a) a synthetic polymer, and
b) a novel mixture containing phenothiazines as claimed herein.

Useful compositions are also those comprising
a) a polyolefin or an elastomer, and
b) a novel mixture containing phenothiazines as claimed herein.

The invention further relates to the use of the novel mixtures containing phenothiazines as antioxidants in organic material which is subject to degradation induced by oxidation, heat and exposure to actinic light.

The invention is illustrated in more detail by the following Examples in which, unless otherwise stated, percentages or parts are by weight.

Example 1: Preparation of the mixture of diphenylamines 169.2 g of diphenylamine and 33.8 g of activated alumina (Fulcat ®22b, ex Laporte Industries) are charged to a reactor with stirrer and thermocouple and heated to 165° C. As soon as the mixture has become sufficiently mobile it is stirred. Then 196.4 g of diisobutylene are added in portions such that the temperature of the reaction mixture does not fall below 165° C. The addition takes 5 hours until the reaction is complete. Reflux commences immediately upon the onset of reaction. Heating and stirring are continued at 165° C. while frequently taking samples until analysis by gas liquid chromatography shows a concentration of 4,4'-di-tert-octyldiphenylamine of less than 25% by weight (without catalyst). The reaction mass is cooled to below 60° C. and the catalyst is removed by vacuum filtration. The filtrate is transferred to a distillation unit and, with heating and stirring, the pressure is reduced to 2.6 kPa. During the distillation the external temperature is slowly allowed to rise to 165° C. and kept constant at this value for over 2 hours, while the distillation comes to a stop. Yield: 300 g of a dark, viscous liquid (A) with a flash point of 210° C.

The main components of the liquid are: 3.2 % of diphenylamine, 13.2 % of mono-tert-butyldiphenylamines, 25.3 % of mono-tert-octyldiphenylamines and di-tert-butyldiphenylamines, 24.2 % of tert-butyl-tert-octyldiphenylamines, 24.3% of di-tert-octyldiphenylamines, 24.3 % of di-tert-octyldiphenylamines and further higher alkylated diphenylamines. The concentration of 4,4'-di-tert-octyldiphenylamine is 18.2 % and small amounts of diphenylamines with partially modified side-chains and polymers. The substituted diphenylamines are mixtures of isomers, except the 4,4'-di-tert-octyl derivative.

Example 2: Preparation of the Mixture 1125.6 g (4 mol) of product (A) obtainable according to Example 1, 32.1 g (1 mol) of sulfur and 3.4 g (0.67 mol) of iodine are charged to a reactor and heated to 165° C. The onset of reaction is immediate and is detectable from the evolution of $H_2S$. The $H_2S$ is removed continuously from the reaction mixture and destroyed by passing it through an aqueous NaOH solution.

After about 2–3 hours at 165° C. no more sulfur can be detected by thin-layer chromatography. The batch is cooled to 8° C. and degassed under a high vacuum for 1 hour at 0.13 Pa. No further working up is necessary and the batch can be used for the intended utility.

Yield: 1134 g of a clear, brown oil which is virtually odourless.

Analysis: C: 84.1%, H: 9.7%, N: 4.5%, S: 1.5%.
Molecular weight: 300–310.

Examples 3–5: Example 2 is repeated, except that the reaction is carded out with different amounts of sulfur.

|  | Amount of S used | Sulfur content in the final product |
|---|---|---|
| Example 3 | 72.7 g (2.26 mol) | 3.4% |
| Example 4 | 126.3 g (3.9 mol) | 5.9% |
| Example 5 | 203.3 g (6.3 mol) | 9.5% |

Examples 6–7: A specific amount of the product of Example 2 is added to two different base oils,, which are subjected to different standard test procedures. These procedures are:

1 ) ROBOT (ASTM D-2272-85)

The Rotary Bomb Oxidation Test (ROBOT) is a rapid screening method and is used to test the stability to oxidation of engine oils and industrial lubricant oils.

The test apparatus consists of a steel cylindrical pressure vessel which rotates axially at an angle of 30° to the horizontal in a heating bath heated to 150° C. 50 g of the lubricant oil for testing and 5 g of water are added jointly with a copper coil as catalyst to the glass insert of the steel bomb and then an oxygen pressure of 620 kPa (90 psi) is applied at room temperature. The bath temperature of 150° C. causes the oxygen pressure to rise rapidly to 1380 kPa (200 psi). The pressure then remains constant until the continuously registering manometer records a drop in pressure as a result of the onset of oxidation.

The test is terminated when a fall in pressure of 170 kPa (25 psi) is registered. The test result is the time elapsed until termination of the test.

2) TOST

The Turbine Oil Stability Test (TOST) is a long-term test and is used for determining the ageing performance of stabilized steam turbine and hydraulic oils.

A 300 ml lubricant oil sample, to which 60 ml of distilled water has been added, is subjected to ageing at 95° C. by introducing oxygen in the presence of steel and copper wire. The ageing is detected by the neutralisation number which is determined at intervals. The oil for testing is subjected to ageing in the present instance for 1000 hours. Afterwards the acid number TAN (in mg of KOH consumption per g of test oil) as well as the sludge formation (in mg of residue per batch) are determined. The TOST life value is also determined. This value is the final state, measured in hours, at which a neutralisation number of 2.0 mg of KOH/g of oil is attained.

The base oils are:
a) Mobil STOCK 305 (containing 0.54% of S), to which 0.05% of a commercial oil-soluble corrosion inhibitor based on a monoalkenylsuccinate and 0.05% of a commercial oil-soluble metal deactivator based on a triazole derivative are added.
b) Exxon 1243 (containing 0.19% of S), to which 0.05% of a commercial oil-soluble corrosion inhibitor based on a monoalkenylsuccinate is added.
c) Oil YI (Gulf Petrol Canada), containing 0.000% of S. Viscosity at 40° C.: 34.88 Cs. This oil is a so-called hydrorefined oil (hydro-treated base stock oil).

The values obtained are reported in Tables I and II.

TABLE I

| Example | Base oils | Additive of Example 2 (in %*) | RoBOT (min) | TOST (1000 h) TAN (mg KOH) | Sludge (mg) | TOST (life) in hours |
|---|---|---|---|---|---|---|
| 6 | a) | 0.25 | 486 | 0.55 | 39 | 4750 |
| 7 | b) | 0.25 | 169 | 0.38 | 17 | 3200 |
| Comparison | a) | — | 31 | >2 | >5000 | <60 |
|  | b) | — | 29 | >2 | >5000 | <30 |

TABLE II

| Example | Base oil | Additive of Example 2 (in %*) | TOST (500 h) TAN (mg KOH) | Sludge (mg) |
|---|---|---|---|---|
| 8 | c) | 0.25 | ~0 | 42 |
| Comparison | c) | — | >2 | >1000 |

*Based on the base oil

What is claimed is:

1. A mixture containing phenothiazines obtained by reacting a mixture of diphenylamines, wherein the % by weight is based on the total mixture of diphenylamines, comprising
   (a) 1 to 5% by weight of diphenylamine,
   (b) 8 to 18% by weight of 4-tert-butyldiphenylamine;
   21 to 31% by weight of one or more compounds selected from the group consisting of:
   i) 4-tert-octyldiphenylamine,
   ii) 4,4'-di-tert-butyldiphenylamine and
   iii) 2,4,4'-tris-tert-butyldiphenylamine;
   (d) 20 to 31% by weight of one of more compounds selected from the group consisting of
   i) 4-tert-butyl-4'-tert-octyldiphenylamine,
   ii) 2,2'- or 2,4'-di-tert-octyldiphenylamine and
   iii) 2,4-di-tert-butyl-4'-tert-octyldiphenylamine; and
   (e) 15 to 29% by weight of the compound
   i) 4,4'-di-tert-roctyldiphenylamine, or the compounds
   i) 4,4'-di-tert-octyldiphenylamine and
   ii) 2,4-di-tert-octyl-4'-tert-butyldiphenylamine, with 1 to 200 mol % of elemental sulfur, in the presence of 0.25 to 5 mol % of a condensation catalyst selected from the group consisting of iodine, aluminium bromide, aluminium chloride, iron (III) chloride, antimony chloride, copper iodide or sulfur iodide, in the temperature range from 80 to 250° C.

2. A mixture containing phenothiazines according to claim 1 obtained by reaction with 5 to 200 mol % of elemental sulfur.

3. A mixture according to claim 2 obtainable by reaction with 5 to 150 mol % of elemental sulfur.

4. A mixture containing phenothiazines according to claim 1, obtained by reaction of 180 to 200 mol % of elemental sulfur.

5. A mixture containing phenothiazines according to claim 1, obtained by reaction with 50 to 100 mol % of elemental sulfur.

6. A mixture containing phenothiazines according to claim 1, obtained by reaction with 20 mol % of elemental sulfur.

7. A composition comprising
   a) an organic material which is subject to degradation induced by oxidation, heat or exposure to actinic light, and
   b) a mixture containing phenothiazines as claimed in claim 1.

8. A composition according to claim 7 wherein the organic material of component (a) is a lubricant selected from the group comprising of mineral oils, synthetic oils or a mixture thereof.

9. A composition according to claim 7 wherein the organic material of component (a) is a synthetic polymer.

10. A method of stabilizing organic materials which are subject to degradation induced by oxidation, heat or exposure to actinic light, which comprises incorporating therein or applying thereto a mixture containing phenothiazines as claimed in claim 1.

11. A process for the preparation of a mixture containing phenothiazines, which comprises
   reacting a mixture of diphenylamines, wherein the % by weight is based on the total mixture of diphenylamines, comprising
   a) 1 to 5% by weight of diphenylamine,
   (b) 8 to 18% by weight of 4-tert-butyldiphenylamine;
   (c) 21 to 31% by weight of [c)]one or more compounds selected from the group consisting of
   i) 4-tert-octyldiphenylamine,
   ii) 4,4'-di-tert-butyldiphenylamine and iii) 2,4,4'-tris-tert-butyldiphenylaminel
(d) 20 to 31% by weight of one of more compounds selected from the group consisting of
  i) 4-tert-butyl-4'-tert-octyldiphenylamine,
  ii) 2,2'- or 2,4'-di-tert-octyldiphenylamine and
  iii) 2,4-di-tertbutyl-4'-tert-octyldiphenylamine; and
(e) 15 to 29% by weight of the compound
  i) 4,4'-di-tert-octyldiphenylamine, or the compounds
  i) 4,4'-di-tert-octyldiphenylamine and
  ii) 2,4-di-tert-cictyl-4'-tert-butyldiphenylamine, with 1 to 200 mol % of elemental sulfur, in the presence of 0.25 to 5 mol % of a condensation catalyst selected from the group consisting of iodine, aluminium bromide, aluminium chloride, iron (III) chloride, antimony chloride, copper iodide or sulfur iodide, in the temperature range from 80 to 250° C.

12. A process according to claim 11, wherein the reaction is carded out with 5 to 200 mol %, of elemental sulfur.

13. A process according to claim 11, wherein the reaction is carried out in the presence of 0.5–2 mol % of catalyst.

14. A process according to claim 11, wherein the reaction is carried out in the presence of iodine as catalyst.

15. A process according to claim 11, wherein the reaction is carried out with 0.:5–1 mol % iodine as catalyst.

16. A process according to claim 11 wherein the reaction is carried out with 5 to 150 mol% of elemental sulfur.

* * * * *